B. P. HANSON.
TENDER FOR AUTOMOBILES AND OTHER VEHICLES.
APPLICATION FILED AUG. 7, 1915.
1,181,877. Patented May 2, 1916.
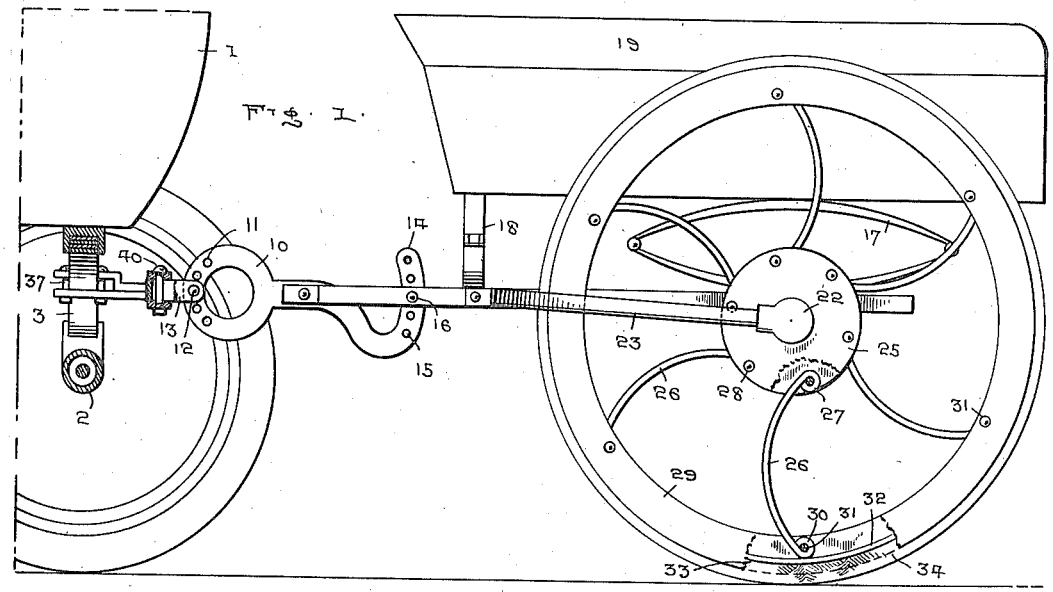
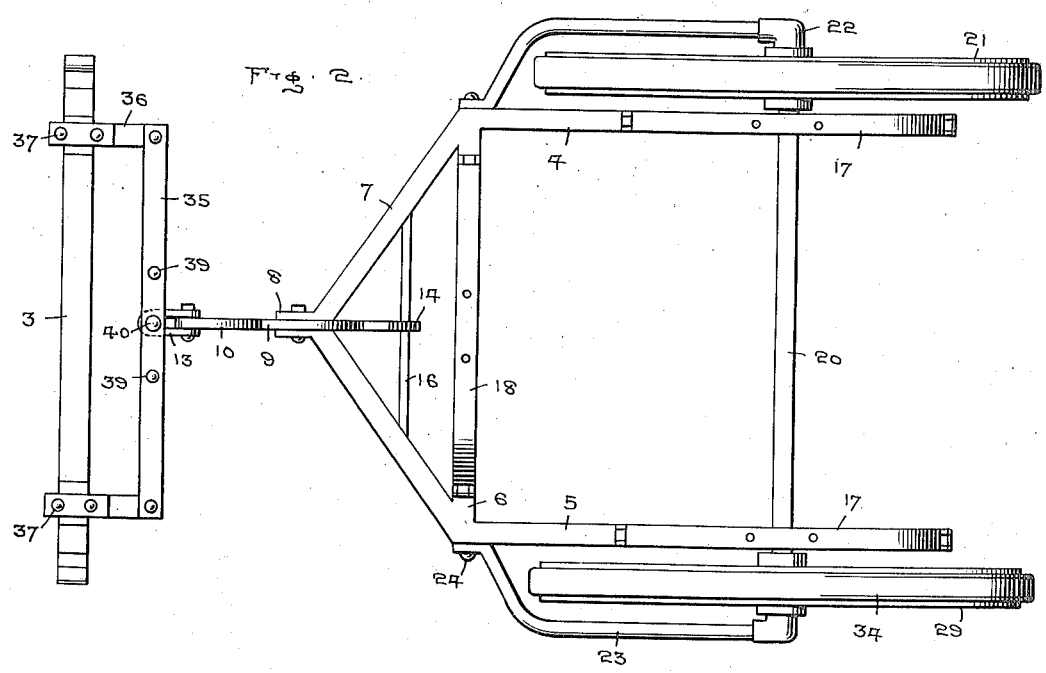
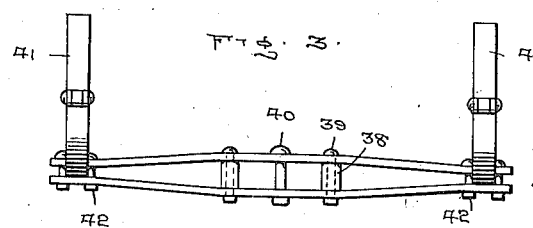
Witnesses
Inventor
B. P. Hanson,
By W. J. FitzGerald
Attorney

UNITED STATES PATENT OFFICE.

BENNIE P. HANSON, OF BANCROFT, IOWA.

TENDER FOR AUTOMOBILES AND OTHER VEHICLES.

1,181,877.      Specification of Letters Patent.      Patented May 2, 1916.

Application filed August 7, 1915. Serial No. 44,158.

*To all whom it may concern:*

Be it known that I, BENNIE P. HANSON, a citizen of the United States, residing at Bancroft, in the county of Kossuth and State of Iowa, have invented certain new and useful Improvements in Tenders for Automobiles and other Vehicles; and I do hereby declare the following to be a full, clear, and exact description of the invention, such as will enable others skilled in the art to which it appertains to make and use the same.

My invention relates to new and useful improvements in tenders for automobiles and other vehicles and my object is to provide a device adapted to be attached to the rear of the automobile or vehicle for carrying packages, trunks and for various other purposes.

A further object is to provide means for attaching the tender to the vehicle. And a further object is to provide means for adjusting the angle of the body of the tender.

Other objects and advantages will be hereinafter set forth and more particularly pointed out in the accompanying specification.

In the accompanying drawings which are made a part of this application, Figure 1 is a side elevation partly in section of the rear portion of an automobile showing my improved form of tender attached thereto. Fig. 2 is a top plan view of the frame of the tender showing the manner of attaching the same to the springs of an automobile, and Fig. 3 is an elevation of a different manner of attaching the tender to the springs of a vehicle.

Referring to the drawings in which similar reference numerals designate corresponding parts throughout the several views, 1 indicates the body of the automobile, 2 the supporting axle therefor and 3 the spring employed for connecting the body to the axle, which, in this instance, is of the Ford type wherein the rear spring extends transversely of the body and longitudinally of the axle. Positioned in the rear of the vehicle is my improved tender which consists of an angular frame 4, preferably constructed of metal and consisting of side bars 5 and a cross bar 6, the forward ends 7 of the side bars, from the point of connection between the side bars and cross bar being extended inwardly at an angle until they come together at a point coincident with the longitudinal axis of the tender, the meeting ends of the end member 7 being slightly spaced apart and extended forwardly to form parallel ears 8 between which is pivotally connected an adjusting link 9.

The forward end of the link 9 is provided with a ring like head 10 in which are formed a plurality of openings 11 to receive a bolt 12 carried by a clevis 13, said bolt extending transversely through the free ends of the clevis and the interposed portion of the head 10 and by providing a plurality of openings, the end of the link may be adjusted to various heights. The opposite end of the link 9 is provided with a downwardly and then upwardly curved terminal 14, the vertical portion of which is provided with a plurality of openings 15 to receive a bolt 16, said bolt extending transversely through the ends 7 and through one of the openings 15 of the terminal, and by this arrangement, the angle of the frame 4 may be adjusted to various degrees. Attached to the side bars 5 and the cross bar 6 are springs 17 and 18 respectively, which springs are preferably of elliptical formation and support a body 19 in which articles are to be placed for transportation by the tender. The rear end of the frame 4 is supported by an axle 20 on which are mounted wheels 21, the extreme outer ends of the axle projecting through the hubs of the wheels and having attached thereto elbows 22, which are preferably threaded on the ends of the axle, the opposite ends of the elbows receiving brace rods 23, the forward ends of the brace rods being projected beyond the periphery of the wheel and bent inwardly and secured to the side bars 5 by means of bolts or rivets 24. The rods 23, when attached in the manner shown securely brace the axle and parts of the frame to which they are attached. The hubs of the wheels are preferably constructed of a pair of disks 25 between which are secured the ends of the spring spokes 26, the inner ends of the spokes having loops 27 through which extend bolts 28, said bolts also passing through the disks 25 to pivotally secure the inner ends of the spokes between said disks.

The outer ends of the spokes are positioned between a pair of circular flanges 29, said outer ends also having loops 30 to receive bolts 31 by means of which the outer ends of the spokes are pivotally secured between said flanges. A circular band 32 is positioned between the flanges 29 and is so positioned as to normally engage the loops on the outer ends of the spring spokes, and by positioning the band a distance from the outer edges of said flanges a channel 33 is formed around the wheel structure for the reception of a tire 34 preferably of solid rubber, although said tire may be constructed of any suitable material.

By constructing the wheel in the manner shown, the spokes will give a cushioning effect as well as the tire, thus practically fully absorbing any shock received upon the wheels.

In attaching the tender to the rear end of the automobile or vehicle, a pair of paralleling draft bars 35 are extended longitudinally of the axle and are secured to the springs 3 by means of straps 36, said straps being arranged in pairs and having one of their ends secured between the ends of the draft bars, while the opposite ends straddle the spring and are clamped thereon by means of bolts 37. The draft bars are held in separated position by means of space blocks 38 through which extend bolts 39 and in order to pivotally secure the tender to the draft bars, a bolt 40 is extended downwardly through said draft bars at their longitudinal center and surrounding said bolt is the closed end of the clevis 13. When that form of spring shown in Fig. 3 is encountered, the strap members 36 are dispensed with and the ends of the draft bars are secured directly to the springs 41 by means of bolts 42, or the like.

The utility of this device will be readily apparent and in view of its simplicity of construction can be very cheaply manufactured and readily connected to any make of automobile or vehicle. It will likewise be seen that the body of the tender can be readily tilted to any desired angle through the medium of the adjustable features of the adjusting link. And it will likewise be understood that although I have shown but six spokes for the wheel, a greater number may be used if desired.

Having thus fully described my invention what I claim as new and desire to secure by Letters Patent of the United States, is:—

1. A tender for vehicles, comprising the combination with a frame and supporting wheels therefor, of a link pivoted to said frame, said link having a ring like head at one end and a curved terminal at the opposite end, said head and terminal having openings therethrough, a clevis, means to adjustably secure said head to said clevis, and means to secure the clevis to the rear portion of the vehicle.

2. A tender for vehicles comprising a frame, supporting wheels therefor, said frame having forwardly and inwardly directed ends, said ends terminating in parallel ears, a link pivotally secured between said ears, means at one end of the link to adjust the angle of the frame with respect to the link, a clevis adjustably secured to the opposite end of said link, draft bars to which said clevis is pivotally attached, and means to secure the draft bars to parts of a vehicle.

In testimony whereof I have signed my name to this specification in the presence of two subscribing witnesses.

BENNIE P. HANSON.

Witnesses:
   Jos. J. SHERMAN,
   E. V. ZIGRONG.